Sept. 2, 1969   H. E. McCABE   3,464,286
REMOTE CONTROL ASSEMBLY
Filed Oct. 10, 1966
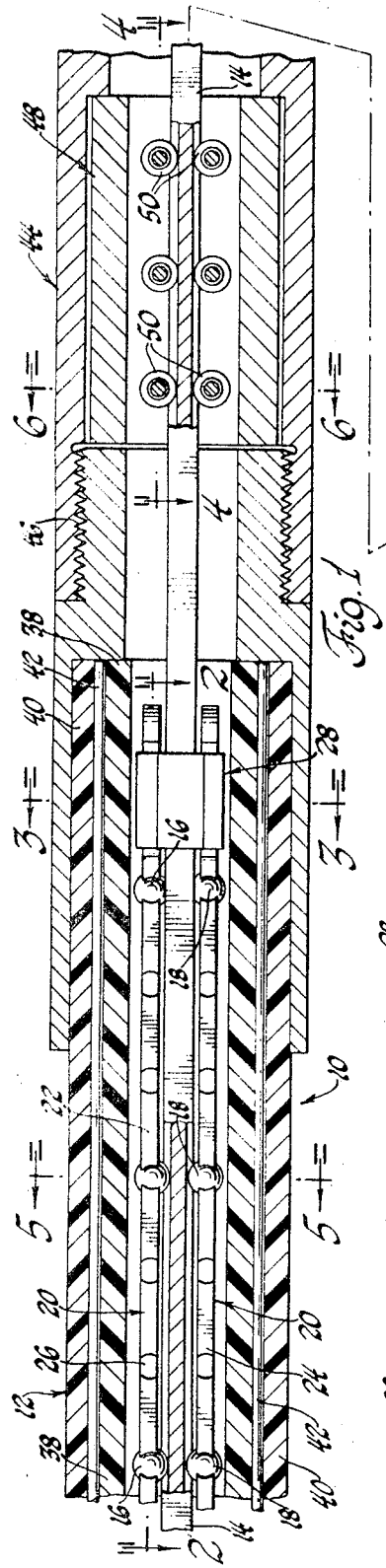
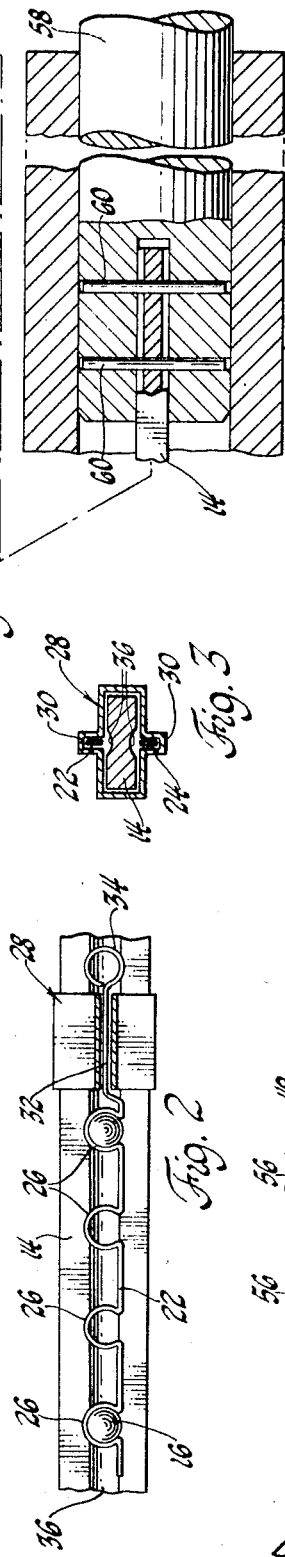
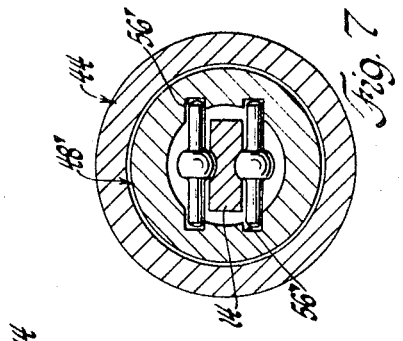
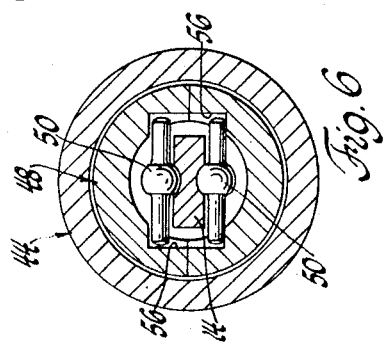
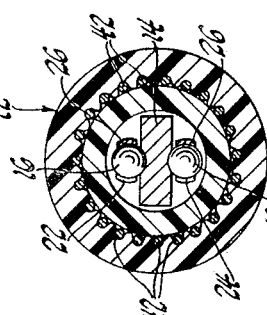
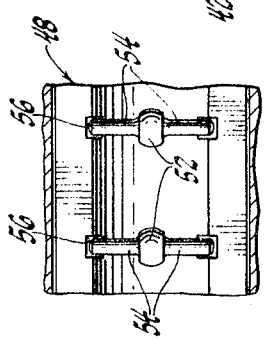
INVENTOR.
Harold E. McCabe
BY
Barnard, McGlynn & Reising
ATTORNEYS United States Patent Office 3,464,286
Patented Sept. 2, 1969

3,464,286
REMOTE CONTROL ASSEMBLY
Harold E. McCabe, Mahopac Falls, N.Y., assignor to Teleflex Incorporated, North Wales, Pa., a corporation of Delaware
Filed Oct. 10, 1966, Ser. No. 585,637
Int. Cl. F16c 1/20
U.S. Cl. 74—501                                29 Claims

ABSTRACT OF THE DISCLOSURE

A motion transmitting remote control assembly wherein a conduit therefor comprises an inner tubular member with a plurality of filaments helically wrapped therearound on a long lead and a casing disposed about the filaments and the inner tubular member. The core element is movably disposed within the conduit, and roller elements engage the core element for facilitating movement of the core element in the conduit. At least one flat strip, which is longitudinally flexible and spaced from the core element, maintains the roller elements in proper orientation, and the flat strip further allows expansion and contraction of the strip for holding the roller elements spaced on bends.

---

This invention relates to a motion transmitting remote control assembly which is normally operated to control a device by transmitting tension or compression in a curved path by means of a flexible core element. More specifically, this invention relates to a heavy-duty remote control assembly wherein high loads are transmitted over a long distance by a flexible core element which is movably supported within a conduit on roller elements to facilitate the movement thereof.

As alluded to above, remote control assemblies of the instant type are used to transmit relatively high loads over long tortuous paths. For example, such remote control assemblies are frequently utilized in aircraft to extend from the cockpit to a remotely positioned device in the aircraft.

Various assemblies which utilize roller elements for supporting a motion transmitting core element have been utilized in the past. In many prior art assemblies, spherical balls are in rolling engagement with each side of the core element and a pair of races extend along the conduit and the spherical balls are in rolling engagement with the races. When the core element is moved in such an assembly, reactive loads or forces are created by such movement. It has been the practice in such assemblies to secure at least one of the races in position so that it cannot move longitudinally relative to the conduit. With the race thus fixed, the neutral bending axis is the axis of the fixed race; however, the geometrical axis is the axis of the motion transmitting core element. Of course, when such an assembly is installed in a tortuous path, it naturally tends to bend about the geometrical axis but such bending is prohibited because of the fixed race. Hence, the bending axis is the axis of the fixed race. Thus, the installation of such assemblies is limited to situations wherein the fixed race is on the inside of the bend.

Many of the piror art assemblies also utilize cages for positioning the roller elements along the conduit. These cages typically comprise a semi-rigid strip of metal which extends within and along the conduit and engages the roller elements so that the roller elements are in rolling contact with the core element and a race, or the inner diameter of the conduit if a race is not utilized. When the core element in such assemblies is actuated, the roller elements tend to move along the conduit which in turn places significant longitudinal loads or forces on the cages. These loads frequently buckle the cages between adjacent roller elements so that the cages contact either the races or the inner diameter of the conduit when races are not utilized, or the core element to create high friction loads which in turn significantly impair the movement of the core element. In most assemblies, a cage is utilized on each side of the core element for positioning the roller elements on the respective sides of the core element and such cages are frequently free to move longitudinally within the conduit. Thus, in some instances the ends of the respective cages become displaced longitudinally from the end of the conduit and from one another so that one side of the core element is not supported or in rolling engagement with roller elements and buckles upon movement.

Accordingly, it is an object and feature of this invention to provide a motion transmitting remote control assembly utilizing roller elements in rolling engagement with the core element and which has a bending axis which coincides with the geometrical axis or the axis of the motion transmitting core element whereby the assembly may be bent in any direction.

Another object and feature of this invention is to provide a remote control assembly utilizing roller elements in rolling engagement with the core element and a pair of retainer means interconnecting the roller elements on the respective sides of the core element and which retainer means are expandable and contractable to allow the distance between adjacent roller elements to change without buckling the retainer means thereby preventing high frictional loads which resist movement of the core element.

A further object and feature of this invention is to provide a motion transmitting remote control assembly utilizing roller elements in a conduit and in rolling engagement with a core element with a pair of retainer means interconnecting the roller elements on the respective sides of the core element and including means operatively interconnecting the retainer means adjacent the end of the conduit to allow the retainer means to move relative to the conduit and to move a limited amount relative to one another.

A still further object and feature of this invention is to provide a remote control assembly utilizing roller elements and retainer means interconnecting the roller elements with the retainer means free to move longitudinally within the conduit and including a conduit having tension means for transmitting reactive loads resulting from the movement of the core element.

In general, these and other objects and features may be attained in a preferred embodiment including a conduit comprising an inner tubular member with a plurality of filaments helically wrapped thereabout on a long lead and a casing disposed about the filaments and the inner tubular member. A motion transmitting core element is movably disposed within the conduit and roller elements engage the core element for facilitating movement of the core element in the conduit. A first plurality of roller elements are in rolling engagement with one side of the core element and are interconnected by a flat strip having a plurality of convolutions for allowing expansion and contraction of the strip, and a second plurality of roller elements are in rolling engagement with the other side of the core element and are interconnected by another flat strip having a plurality of convolutions for allowing expansion and contraction thereof. The roller elements are rotatably disposed in convolutions in the respective flat strips. In addition, a means operatively interconnects the first and second strips adjacent one end of the conduit and allows the strips to move longitudinally relative to the conduit and to move a limited amount relative to one another. In addition, a fitting is attached to the end of the conduit and a guide means is rotatably supported in the fitting to prevent the buckling of the core element between the end of the conduit and the position at which the core element is attached to a terminal member which is slidably disposed in the fitting. The guide means includes rotating elements which are in rolling engagement with the core element. Hence, a remote control assembly constructed in accordance with this invention may be installed in a long tortuous path to transmit relatively high loads with a minimum of friction resisting movement of the core element.

Other objects and attendant advantages of this invention will be readily appreciated as the same becomes better understood by reference to the following detailed description when considered in connection with the accompanying drawings wherein:

FIGURE 1 is a fragmentary cross-sectional view of a preferred embodiment of the instant invention;

FIGURE 2 is a fragmentary cross-sectional view taken substantially along line 2—2 of FIGURE 1;

FIGURE 3 is a fragmentary cross-sectional view taken substantially along line 3—3 of FIGURE 1;

FIGURE 4 is a fragmentary cross-sectional view taken substantially along line 4—4 of FIGURE 1;

FIGURE 5 is a cross-sectional view taken substantially along line 5—5 of FIGURE 1;

FIGURE 6 is a cross-sectional view taken substantially along line 6—6 of FIGURE 1; and FIGURE 7 is a cross-sectional view similar to FIGURE 6 showing an alternative embodiment of the guide means of the instant invention.

Referring now to the drawings, wherein like numerals indicate like or corresponding parts throughout the several views, a preferred embodiment of the motion transmitting remote control assembly of the instant invention is generally shown at 10.

The remote control assembly 10 includes a conduit, generally indicated at 12, and a motion transmitting core element 14 which is movably disposed within the conduit 12. A plurality of roller elements 16 and 18 are disposed within the conduit 12 and engage the core element 14 for facilitating movement of the core element relative to the conduit. Retainer means, generally indicated at 20, is spaced from core element 14 as seen in FIGURE 1 and interconnects the rollers 16 and 18 and is expandable and contractable for allowing the distance along the conduit between adjacent roller elements to change.

The retainer means 20 includes a first flat strip 22 and a second flat strip 24. The strips 22 and 24 extend longitudinally along the conduit 12 and include a plurality of convolutions 26 which allow the expansion and contraction of the strips 22 and 24. A first plurality of roller elements 16 are rotatably disposed in convolutions 26 in the first strip 22 and a second plurality of roller elements 18 are rotatably disposed in convolutions 26 in the second strip 24. Although not necessary, it is preferable that the convolutions 26 be shaped with arcuate surfaces so that the roller elements 16 and 18 may be removably snapped into and retained in the convolutions 26. The first plurality of roller elements 16 engage one side of the core element 14 and the second plurality of roller elements 18 engage the other side of the core element 14.

There is included means, generally indicated at 28, operatively interconnecting the first and second strips 22 and 24 adjacent the ends of the conduit 12 for allowing the strips 22 and 24 to move longitudinally relative to the conduit 12 and to move a limited amount relative to one another. More specifically, the means 28 comprises a sleeve-like member which surrounds the core element 14 and includes portions 30 for surrounding and slidably supporting the respective strips 22 and 24. The sleeve-like member 28 is free to move longitudinally relative to the conduit 12 and relative to the core element 14. Each strip has a straight portion 32 which is slidably disposed in the portions 30 of the sleeve-like member 28 and includes a loop 34 at the end thereof. Thus, the length of the straight portions 32 determines and controls the distance or amount of longitudinal movement of the flat strips 22 and 24 relative to the sleeve-like member 28. The length of the flat sections 32 is short enough, however, to always maintain the strips 22 and 24 substantially coextensive to prevent the core element 14 from becoming unsupported along a length of one side which in turn allows buckling of the core element.

Each of the roller elements is spherical and the core element 14 is substantially rectangular in cross section with grooves 36 extending therealong on opposite sides so that the spherical roller elements 16 and 18 are disposed in coactive rolling engagement in the grooves 36.

The conduit 12 is capable of transmitting reactive loads resulting from the movement of the core element and includes an inner tubular member 38, a casing 40, and a tension means comprising a plurality of filaments 42. The filaments 42 comprise tension means for transmitting reactive loads resulting from movement of the core element within the conduit. The filaments 42 are helically wrapped on a long lead about the inner tubular member 38 and the casing 40 is disposed about the filaments and the inner tubular member. The inner tubular member 38 and the casing 40 are preferably made of an organic polymeric material such as polypropylene, polyethylene, etc.

The remote control assembly 10 also includes a fitting, generally indicated at 44, which comprises two elements threadedly connected together at 46, and attached to one end of the conduit 12. A guide means, generally indicated at 48, is rotatably disposed within the fitting 44 for supporting and guiding the core element 14. That is, the guide means 48 is free to rotate about the axis of the core element 14. The guide means 48 includes the rotating elements 50 which are in rolling engagement with the grooves 36 in the core element 14. As illustrated in FIGURE 4, each rotating element 50 includes a spherical central portion 52 with a spindle 54 extending laterally from opposite sides thereof. As illustrated in FIGURE 6, the guide means 48 comprises a sleeve formed of two halves, each of which includes recesses 56 for receiving and rotatably supporting the spindles 54. Thus, the core element 14 is free to rotate and/or twist along the length of the conduit 12.

An alternative embodiment of the guide means is illustrated in FIGURE 7 at 48'. The guide means 48' comprises a unitary circular sleeve having longitudinal slots 56' for rotatably receiving and supporting the spindles of the rotating elements 50. Spacer means or deformation of the material of the guide means 48' may be utilized to position the rotating elements 50.

There is also included a terminal member 58 which is attached to the end of the core element 14 by the pins 60. The terminal member 58 extends from and is slidably disposed in the fitting 44. The terminal member 58 is usually adapted to be attached to a control element.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A motion transmitting remote control assembly comprising: a conduit, a motion transmitting core element disposed within said conduit, a plurality of roller elements disposed within said conduit and engaging said core element for facilitating movement of said core element relative to said conduit, first retainer means interconnecting a first plurality of said roller elements, and second retainer means interconnecting a second plurality of said roller elements, each of said roller elements being spherical and each of said retainer means including a plurality of spherical pockets therealong with each of said roller elements being rotatably disposed in and retained in one of said pockets, said pockets being spaced from said core element.

2. A motion transmitting remote control assembly as set forth in claim 1 including means operatively interconnecting said first and second retainer means and allowing each of said retainer means to move relative to the other and relative to said conduit.

3. A motion transmitting remote control assembly as set forth in claim 1 including tension means for transmitting reactive loads resulting from movement of said core element within said conduit.

4. A motion transmitting remote control assembly as set forth in claim 3 wherein said conduit includes an inner tubular member and said tension means comprises at least one filament wrapped helically on a long lead about said inner tubular member and a casing disposed about said filament and said inner tubular member.

5. A motion transmitting remote control assembly as set forth in claim 1 wherein said first retainer means includes at least one strip having a plurality of convolutions therealong for allowing the expansion and contraction thereof.

6. A motion transmitting remote control assembly as set forth in claim 5 wherein certain of said convolutions define said pockets.

7. A motion transmitting remote control assembly as set forth in claim 6 wherein said roller elements are removably snapped into and retained in said pockets.

8. A motion transmitting remote control assembly as set forth in claim 1 including a fitting attached to one end of said conduit, and guide means disposed within said fitting for supporting and guiding said core element.

9. A motion transmitting remote control assembly as set forth in claim 8 wherein said guide means includes rotating elements for engaging said core element.

10. A motion transmitting remote control assembly as set forth in claim 9 wherein said guide means is rotatably disposed in said fitting.

11. A motion transmitting remote control assembly as set forth in claim 1 wherein said first and second retainer means include first and second flat strips extending longitudinally along said conduit and having a plurality of convolutions therealong for allowing the expansion and contraction thereof, certain of said convolutions defining said pockets, said first plurality of roller elements being rotatably disposed in said pockets in said first strip and said second plurality of roller elements being rotatably disposed in said pockets in said second strip, said first plurality of roller elements engaging one side of said core element and said second plurality of roller elements engaging the other side of said core element.

12. A motion transmitting remote control assembly as set forth in claim 11 including tension means for transmitting reactive loads resulting from movement of said core element within said conduit.

13. A motion transmitting remote control assembly as set forth in claim 12 including means operatively interconnecting said first and second strips and allowing said strips to move longitudinally relative to said conduit and relative to one another.

14. A motion transmitting remote control assembly as set forth in claim 13 wherein said core element has a substantially rectangular cross section with grooves extending therealong and on opposite sides thereof, said spherical roller elements being disposed in said grooves.

15. A motion transmitting remote control assembly as set forth in claim 14 wherein said tension means includes a plurality of filaments helically disposed on a long lead along said conduit.

16. A motion transmitting remote control assembly as set forth in claim 15 wherein said conduit includes an inner tubular member and an outer casing, said filaments being helically wrapped about said inner tubular member and said casing being disposed about said filaments and said inner tubular member.

17. A motion transmitting remote control assembly as set forth in claim 16 wherein said first and second strips are slidably retained in and extend through said means operatively interconnecting said strips, each of said strips having a loop therein so that the amount of longitudinal movement of each strip relative to the other is limited.

18. A motion transmitting remote control assembly as set forth in claim 17 wherein said means operatively interconnecting said strips is disposed about said core element and is free to move longitudinally relative to said conduit and said core element.

19. A motion transmitting remote control assembly as set forth in claim 18 including a fitting attached to one end of said conduit, and guide means disposed within said fitting and engaging said core element for supporting and guiding said core element.

20. A motion transmitting remote control assembly as set forth in claim 19 wherein said guide means includes rotating elements for engaging said core element.

21. A motion transmitting remote control assembly as set forth in claim 20 wherein said guide means includes a sleeve rotatably disposed in said fitting.

22. A motion transmitting remote control assembly as set forth in claim 21 wherein each of said rotating elements includes a spherical central portion with a spindle extending laterally from opposite sides thereof, said sleeve having recesses for receiving and rotatably supporting said spindles, said spherical central portions being in engagement with said grooves in said core element.

23. A motion transmitting remote control assembly as set forth in claim 22 including a terminal member attached to the end of said core element and extending from and slidably disposed in said end fitting.

24. A motion transmitting remote control assembly comprising: a conduit, a motion transmitting core element disposed within said conduit, a first and a second plurality of roller elements disposed along said conduit and engaging said core element, said first plurality of roller elements being disposed along one side of said core element and said second plurality of roller elements being disposed along the other side of said core element, first retainer means extending longitudinally along said conduit and engaging said first plurality of roller elements, second retainer means extending longitudinally along said conduit and engaging said second plurality of roller elements, and means operatively interconnecting said first and second retainer means for allowing said retainer means to move longitudinally relative to said conduit and to move longitudinally a limited amount relative to one another.

25. A motion transmitting remote control assembly as set forth in claim 24 including tension means for transmitting reactive loads resulting from movement of said core element within said conduit.

26. A motion transmitting remote control assembly as set forth in claim 25 wherein said conduit includes an inner tubular member and a casing, said tension means comprising a plurality of filaments wrapped helically about said inner tubular member on a long lead, said casing being disposed about said filaments and said inner tubular member.

27. In a motion transmitting remote control assembly of the type including a conduit with a motion transmitting core element movably disposed in said conduit and roller elements disposed along and engaging said core element to facilitate the movement thereof, the improvement combination comprising a conduit capable of transmitting reactive loads resulting from the movement of said core element, a first plurality of said roller elements disposed along one side of said core element and a second plurality of said roller elements disposed along the other side of said core element, first retainer means extending longitudinally along said conduit and positioning said first plurality of roller elements, and second retainer means extending longitudinally along said conduit and positioning said second plurality of roller elements, said first and second retainer means being free to move longitudinally relative to said conduit and relative to one another a controlled distance, each of said roller elements being spherical and each of said retainer means including a plurality of spherical pockets therealong with each of said roller elements being rotatably disposed in and retained in one of said pockets, said pockets being spaced from said core element.

28. In a motion transmitting remote control assembly as set forth in claim 27 including means operatively interconnecting said first nad second retainer means for limiting the amount of relative longitudinal movement therebetween.

29. A motion transmitting remote control assembly including a conduit, a motion transmitting core element movably disposed in said conduit, a fitting attached to one end of said conduit, guide means rotatably disposed in said fitting, a plurality of rotating element, each of said rotating elements including an arcuate central portion and a spindle extneding laterally from opposite sides thereof, said spindles being rotatably supported by said guide means, said arcuate central portion being in rolling engagement only with said core element.

References Cited

UNITED STATES PATENTS

| | | | |
|---|---|---|---|
| 1,197,466 | 9/1916 | Englerth et al. | 308—201 |
| 1,228,312 | 5/1917 | Garnier. | |
| 2,694,130 | 11/1954 | Howard. | |
| 2,983,559 | 5/1961 | Blinder | 308—200 |
| 3,128,637 | 4/1964 | Richoux | 74—501 |
| 3,135,132 | 6/1964 | Bratz | 74—501 |
| 3,192,795 | 7/1965 | Pierce | 74—501 |
| 1,530,381 | 3/1965 | Leedom | 64—2 X |
| 3,261,226 | 7/1966 | Dent | 74—501 |
| 3,362,249 | 1/1968 | Richoux | 74—501 |

FRED C. MATTERN, JR., Primary Examiner

C. F. GREEN, Assistant Examiner

U.S. Cl. X.R.

308—6